June 6, 1933.  B. C. BATCHELLER  1,912,751
METHOD AND MACHINE FOR MAKING GOLF CLUB SHAFTS
Filed April 7, 1928   3 Sheets-Sheet 1
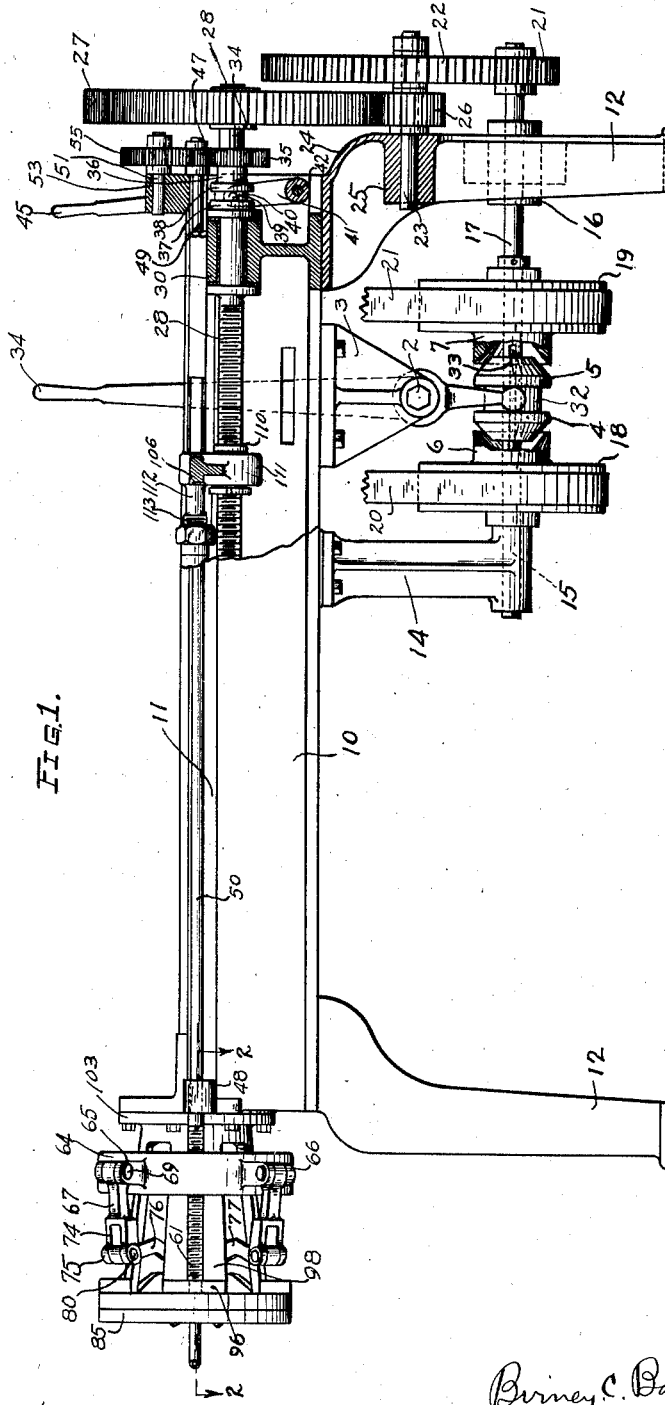
Birney C. Batcheller Inventor.
By Frank M. Slough
Attorney June 6, 1933. B. C. BATCHELLER 1,912,751
METHOD AND MACHINE FOR MAKING GOLF CLUB SHAFTS
Filed April 7, 1928 3 Sheets-Sheet 2
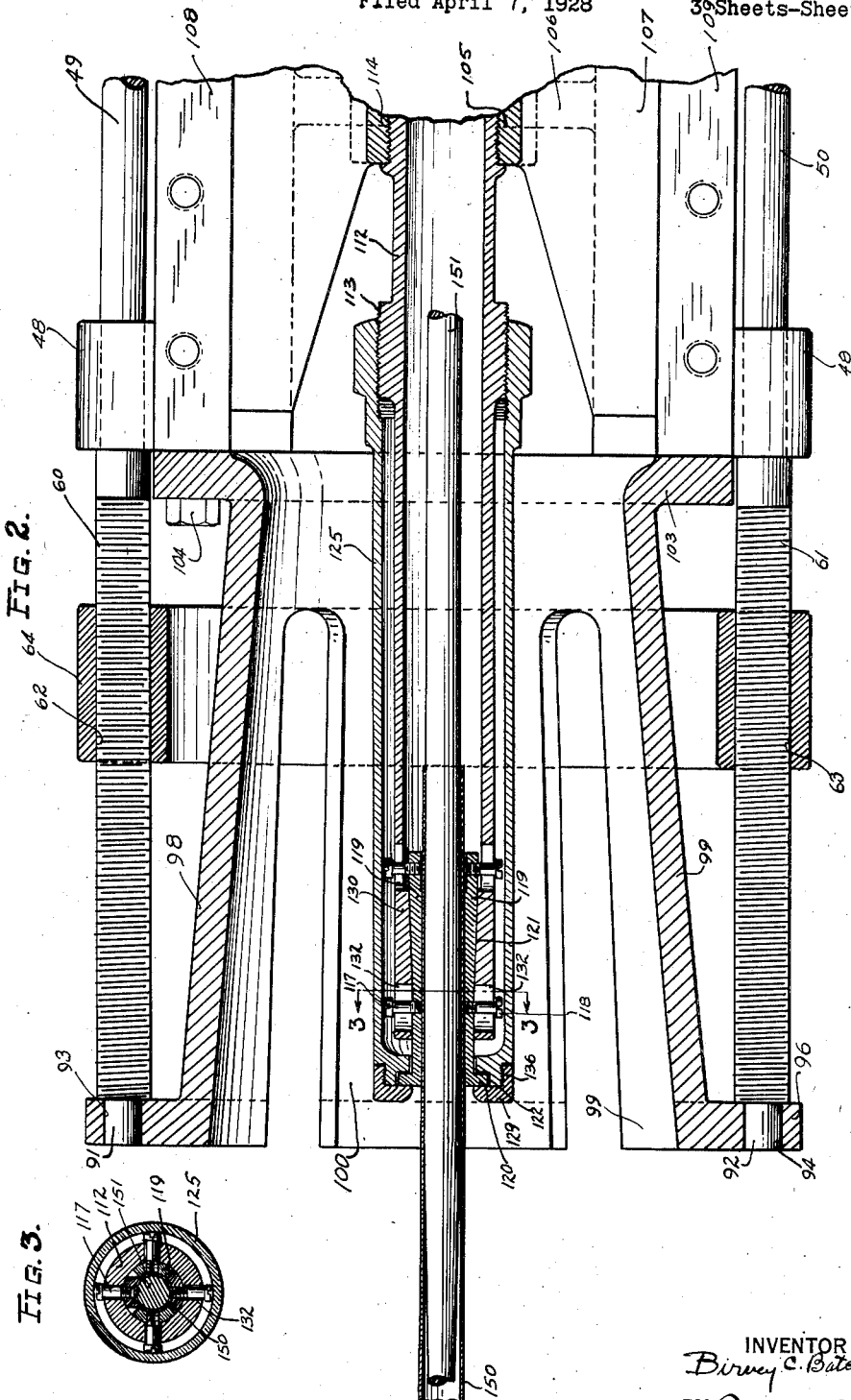

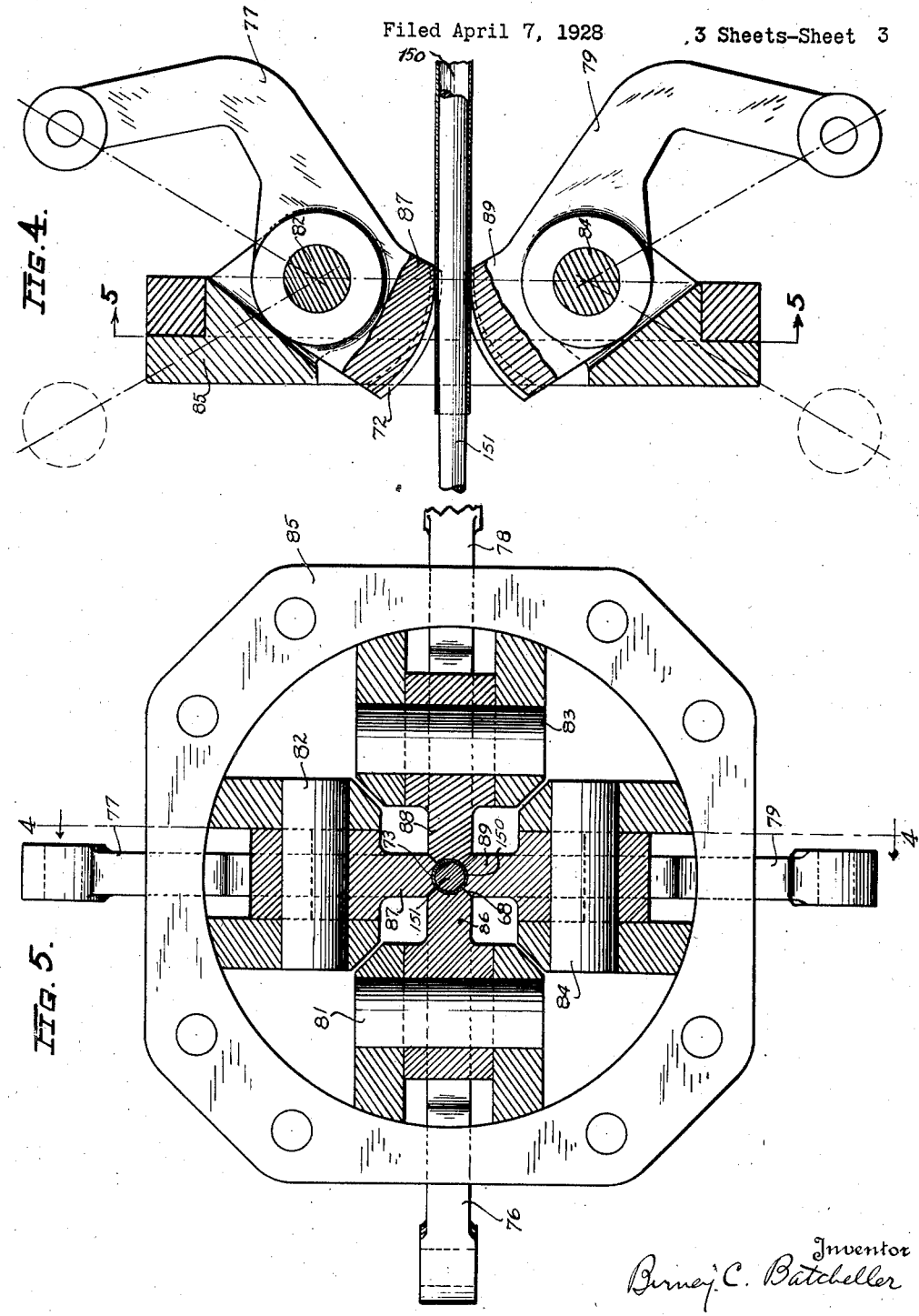

Patented June 6, 1933

1,912,751

UNITED STATES PATENT OFFICE

BIRNEY C. BATCHELLER, OF WALLINGFORD, VERMONT, ASSIGNOR TO THE AMERICAN FORK & HOE COMPANY, OF CLEVELAND, OHIO, A CORPORATION OF OHIO

METHOD AND MACHINE FOR MAKING GOLF CLUB SHAFTS

Application filed April 7, 1928. Serial No. 268,130.

My invention relates to machines and methods for drawing metallic tubular articles and more particularly it relates to machines and methods for producing cold drawn smooth tapered tubes.

One of the objects of my invention resides in the provision of a tube tapering machine capable of forming a smooth uniformly tapered seamless tube.

Another object of my invention is to provide a tube tapering machine which will accomplish the taper in a tube by a combined thrust and rolling or by a combined drawing and rolling action thereon.

Another object of my invention resides in the provision of a tube tapering machine capable of producing a tube having a non-circular cross-sectional configuration.

Another object of my invention is to provide a machine for producing a tapered tube wherein the dimension of the die orifice is automatically varied by a mechanism controlled and timed simultaneously with the travel of the tube through the die.

Another object of my invention is to provide a machine which will be durable in construction, simple and positive in operation, readily operable, and wherein the possibility of the tube's buckling during the tapering operation will be reduced to a minimum.

Another object of my invention resides in the provision of a tube tapering machine wherein provision is made to adapt the same for shaping the die orifices to the desired configuration.

These and other objects of my invention and the invention itself will become apparent from reference to the following description of an embodiment thereof, and in which description reference will be had to the annexed drawings forming a part of this specification.

Referring to the drawings:

Fig. 1 is a side elevational view of a machine embodying my invention; some of the same being broken away and shown in section;

Fig. 2 is a fragmentary longitudinal sectional view of the foregoing embodiment, the view being an enlargement of the same;

Fig. 3 is a transverse sectional view taken on the line 3—3 of Fig. 2, looking in the direction of the arrows;

Fig. 4 is a sectional view taken on the line 4—4 of Fig. 5;

Fig. 5 is a transverse sectional view taken on the line 5—5 of Fig. 4; and

Fig. 6 is an elevational view of a tube produced by the herein referred to embodiment, such as a golf shaft.

Referring to all the figures of the drawings, in all of which like parts are designated by like reference characters, my invention preferably comprises a main frame 10, a table or bed 11, supported on a plurality of legs 12, said frame, bed and legs being preferably formed of a heavy metallic casting, to enable them to withstand the forces to which they are subjected during a drawing operation on a tube, rod or the like.

A driving mechanism for the various parts of the machine is provided and comprises in the preferred embodiment of my invention, a depending bracket 14 supported on the under side of the table 11, having a bore 15 adjacent its lower end for the reception of a bearing. A bearing bracket 16 is bolted to the side of one of the legs 12 and in alignment with the bearing recess 15, which bearings provide a support for a shaft 17. A pair of driven pulleys 18 and 19 are provided and loosely mounted on the shaft 17 and may be driven by belts 20 and 21. The belts are driven by an electric motor, not shown, or by any well-known source of power.

A double acting clutch 32 is slidably mounted on the splined portion 33 of the shaft 17 and is disposed between pulleys 18 and 19. The clutch has a pair of cone elements 4 and 5, and may be reciprocated on the shaft, by the lever 34, to engage cone clutch elements 6 or 7 carried by the pulleys 18 and 19, respectively, to effect a forward or reverse drive of the machine. For example, swinging of the lever 34 to the right will connect the clutch element 4 with the clutch element 6, whereby a forward drive of the machine through the pulleys 18 may be effected. Said lever is pivoted at 2 in a bracket 3 depending from the table.

Said pulleys, when driven, are adapted to drive the machine through a reduction gearing as shown to the right in Fig. 1, and preferably comprising a relatively small spur gear 21 keyed to the projecting end of the shaft 17 and rotatable therewith, said spur gear constantly meshes with a relatively large gear 22 keyed to a shaft 23 journaled in a bearing 25 formed in the leg 12. A spur gear 26 is also keyed to the shaft 23 between the gear 22 and the flange 24 and is constantly in mesh with a large main drive gear 27, which gear is keyed to an end of a main screw drive shaft 28 journaled in each end of the frame 10 in bearings 30, and when driven, the shaft 28 is adapted to traverse the work through the drawing die in a manner which will hereinafter be described in detail.

The end of the shaft 28 is splined at 34 at a portion between the bearing 30 and the gear 27, on which is slidably and relatively non-rotatably mounted a small pinion 35 having a collar 36 provided with a corresponding bore, the collar is provided with a pair of spaced annular flanges 37 and 38 and a circumferential groove 39 adapted to receive a pair of inwardly projecting fingers 40 carried by a yoke 41.

The yoke 41 is keyed to a transversely disposed shaft 42 mounted in journal bearings in the main frame. A lever 45 is secured to a projecting end of the shaft so that the yoke may be swung by an operator to effect a horizontal shifting of the pinion 35 on the shaft 28 into or out of mesh with a gear 47, keyed to a longitudinally extending shaft 49, and a gear, not shown, keyed to a shaft 50 opposite to the gear 47. Shifting of the said pinion 35 out of mesh with the gear 47 may be effected by an operator when it is desired to employ the machine during the process of forming the drawing dies.

Disposed on the opposite side of the frame and on a plane parallel to the shaft 49 is a second screw shaft 50 journaled in bearings 48 at each end of the frame as is the shaft 49, and a gear similar to the gear 47 is keyed to the shaft 50 directly opposite the gear 47 but free from meshing engagement with the pinion 35. Said shafts 49 and 50 are adapted to vary the size of the die orifices in a manner which will hereinafter be set forth in detail.

A gear 55 is provided and keyed to a shaft 51 journaled in a bearing provided in an upstanding bracket 53 disposed adjacent the end of the table. Said gear is constantly in mesh with the pair of gears 47, whereby these gears may be driven simultaneously in the same direction.

Shafts 49 and 50 extend throughout the entire length of the frame and project beyond the end thereof opposite to the end supporting the reduction gearing. The projecting ends are threaded at 60 and 61, as best shown in Fig. 2, and are disposed into diametrically oppositely disposed threaded bores 62 and 63 of a traversing ring 64 formed of cast metal whereby it may withstand heavy strains to which it may be subjected. Rotation of the shafts 49 and 50 through the reduction gears 21 to 47 will cause the ring to be moved to the right or left on a horizontal plane depending upon the direction of rotation thereof and upon which one of the clutch faces are engaged.

A plurality of pairs of lugs extend radially of the ring periphery, preferably four in number, and indicated at 65 and 66, in Fig. 1. These lugs are apertured to provide a pivotal connection for a plurality of links 67, said rings and said lugs are interconnected by virtue of pivot pins 69. There are preferably four of these links. Each of the opposite ends of the links are bifurcated at 74 and are pivotally connected at 75 to a plurality of bell crank levers 76, 77, 78 and 79 by virtue of a plurality of pins 80.

As best shown in Figs. 4 and 5, the bell crank levers are pivoted to a plurality of rods 81, 82, 83 and 84 carried by a die head 85 whereby each of the bell crank levers will oscillate on an axis at right angles to the plane of travel of the tube to be drawn. Cast or forged integral with the bell crank levers are die segments 86, 87, 88 and 89, all of which are projected radially towards each other, and are provided with tapered eccentric grooves 72 in their peripheries, and all of the grooves are joined to provide a circular die orifice 73. The inner contacting edges of the segments are correspondingly beveled at 68 to provide a rigid guiding effect of the die segments for each other when they are oscillated or rolled to vary the diameter of the die orifice by virtue of the shafts 49 and 50 and associated driving mechanism. That is to say, when the die segments are rolled to the right they will cause the die orifice to gradually reduce in diameter by virtue of the eccentric grooves, and due to the taper of the grooves the orifice will be always circular. When the segments are swung to the left the grooves move to a drawing position whereat the die orifice is increased in diameter.

The ends of the screw shafts 49 and 50 are reduced at their ends 91 and 92 and project into recess 93 and 94 in laterally extending flanges 96 of the arms 98 and 99. Said arms are preferably formed integral with an annular flanged ring 103, which ring is bolted to the end of the main frame at 104, adjacent to and to the rear of the die head 85 and extend forwardly of the main frame and flares outwardly. The die head 85 is bolted to the flanges 96, which flanges support the same.

The work gripping and work traversing mechanism heretofore referred to preferably comprises a carriage 105 having elongated laterally projecting sides 106, the ends of which are formed with longitudinally extending ribs 107 adapted to snugly fit slidably within a pair of horizontally extending track flanges in the inner opposed walls of the frame side skirts 108 and 109. Said screw shaft 28 is threaded into a threaded bore 110 formed in a depending portion 111 of the carriage 105 and intermediate the sides of the carriage, whereby the carriage 105 will be reciprocated to the right or to the left depending upon the direction of rotation of the screw shaft 28.

Disposed above the screw shaft 28 is a forwardly extending tubular shaft 112 having an exterior threaded portion 113. One end of the shaft is threaded at 114 and secured in the carriage 105. The opposite end of the tubular shaft 112 is internally tapered as at 130 and formed with pairs of opposed radial slots 132 cut in the side walls of the tubular shaft 112 adjacent the tapered end. Screws 117 having heads 118 project radially into the slots and each is threaded to one of a plurality of tube gripping jaw members 119 which are guided in longitudinal movement by the screws, said jaws are provided with tapered exterior walls 121 and slidable in the tapered end of the tubular shaft, and the outer extending ends thereof are annularly flanged at 120, said flanges projecting into an annular groove 122 in the end of a tubular housing 125 threaded onto the threaded portion 113 of the tubular shaft 112. The jaws are retained in the annular groove 122 by virtue of an annularly flanged ring 129 having an internally threaded collar portion 136 threaded onto the threaded end of the housing.

The bore provided by the jaws 119 is substantially equal in diameter to the diameter of the tube 150 which is to be tapered, over which they are disposed and clamped by virtue of the wedge shaped exterior surfaces and the taper bore of the shaft. A mandrel 151 of tapered formation is placed within the tube 150 before the tube is clamped in the jaws for the drawing operation.

The embodiment described in the foregoing may be operated as follows:

The tapered mandrel 151 is telescoped within a cylindrical tube 150 and the tube and mandrel are then placed in the work gripper or chuck and clamped therein by rotation of the housing 125 causing the jaws 119 to be wedged in the tapered end of the tubular shaft 112, whereby the jaws rigidly grip the tube and hold the same against relative movement in the chuck by virtue of their elongated contacting surfaces.

The operator now swings the handle lever 34 and engages the clutch element 6 with the clutch element 4 to lock the pulley 18 onto the shaft 27 whereby the gears 21, 22, 26 and 27 are rotated.

Let it be assumed that the pinion 35 has been shifted to the left in mesh with the gear 47 whereby the screw shafts 49 and 50 are rotated. Rotation of the shafts 49 and 50 will traverse the ring 64 to the left swinging the die segments to the right through the interposed rings and bell crank levers at a speed substantially ⅛ the speed of the travel of the tube through the die orifice whereby the grooves in the segments are gradually swung starting with the groove ends of largest diameter and gradually decreasing the diameter of the die opening as the die segments are swung. This is accomplished by virtue of the taper eccentricity of the grooves in the die segments.

The screw shaft 28 which is being rotated due to the rotation of the gear 27 slowly traverses the carriage which supports the work clutch or gripper, to the right at a speed substantially 8 times more than the speed of the oscillation of the die segment whereby the die orifice varies in diameter gradually and equal to the varying diameter of the tapered material as it is drawn through the die.

The die sections are rugged in form capable of performing heavy duty without breaking and may be heat treated. I have illustrated and described but four segments joined at their peripheries to provide a die orifice, it is to be understood that I have considered the employment of 5, 6 or 8 such segments and which number may be varied at will. It has also been contemplated that the die grooves, instead of being grooved in cross-section to provide a circular die orifice, may be of non-circular form whereby when the peripheries of the die segments are joined together, a die orifice, for example, of octagonal cross-section may result.

I contemplate sometimes employing the above described machine with a slight addition to the same in the formation of the grooves in the dies to the desired size and shape. This may be accomplished by a very simple process with the proper equipment. For example, a fluted reamer or the like of the exact shape of a model golf stick may be attached to the carriage of the machine in place of a tube, and caused, in a suitable manner, to be moved through the die in the same direction as that of the drawing operation of the tube, the driving means for the machine heretofore described being employed for rotating the reamer as it moves towards the die sections. Simultaneously the segments are slowly swung on their pivots to press their opposed peripheries into contact with the reamer, while the reamer is rotating, whereby the tapered grooves may be formed therein by the reamer.

A reamer which I have found to be successful in forming the tapered grooves in the sectors, may be 45 inches long and $\frac{1}{16}$ of an inch in diameter at one end and ⅝ at the other end. However, I have also found that the reamer may be made in short sections and used successively in place of a single reamer. The die sectors are rugged in construction, capable of performing heavy duty with little likelihood of breaking and of such form that they may be readily heat treated. I sometimes contemplate employing more than five sectors in making up the die, and as many as eight sectors may be advantageously employed in some instances. In such instances, where I employ more than four sectors to comprise the die, I may form the die sectors with flat peripheries and the shaft may be drawn therethrough without rotation, and thus a tubular shaft may be formed of hexagonal or octagonal form in cross section of highly attractive appearance.

Having thus described my invention in a specific embodiment, I am aware that numerous and extensive departures may be made from the embodiment herein illustrated and described without departing from the spirit of my invention.

I claim:

1. In the drawing of tapering tubes, rods or the like by means of a machine provided with a plurality of pivoted die jaws having drawing grooves therein eccentric to the jaw pivots and provided with mechanism for concurrently propelling the work through the grooves and rocking the jaws on their pivots; the method of forming the grooves which includes first forming a cutting tool to the longitudinally tapered form of the outside of the tube or rod to be formed, and then propelling the tool through the grooves along the line in which the work is to be drawn and by the mechanism for propelling the work, and concurrently rocking the jaws on their pivots.

2. In connection with a machine for drawing tubes, rods or the like to pre-selectedly varying diameter by drawing the work through a die pass and concurrently varying the size of the pass, the method of preparing the die pass to cause it to draw the predetermined variations of diameter on the rod or tube which includes forming a tapered cutting tool to the pre-selected form of the work to be drawn, propelling the tool through the die pass to form the size and shape thereof at the same relative rate of movement as the work is to be drawn, and by the machine means for drawing the work through the pass, and concurrently varying the size of the die pass orifice at the same relative rate as it is to be varied when drawing the tube.

3. In a machine for drawing internally and externally tapering tubes, a tapering mandrel of the desired taper of the interior of the tube to be drawn, adapted to be inserted within a tube blank, a chuck adapted to grip the outside of the tube blank and the mandrel therewithin at the large end of the mandrel, a die comprising a plurality of die jaws having drawing grooves therein adapted substantially to enclose the tube, a pivot mounting for each jaw, the drawing groove in the jaw being eccentric with respect to the pivot, means for rocking the jaws simultaneously around their pivots to reduce the orifice produced jointly by the jaws, said means comprising a common jaw operating element, a connection between the element and each jaw, a longitudinally stationary screw threaded through the element, and means for rotating the screw to propel the element thereon, and means for propelling the chuck to simultaneously draw the tube and mandrel through the die.

4. In a machine for drawing internally and externally tapering tubes, a tapering mandrel of the desired taper of the interior of the tube to be drawn, adapted to be inserted within a tube blank, a chuck adapted to grip the outside of the tube blank and the mandrel therewithin at the large end of the mandrel, a die comprising a plurality of die jaws having drawing grooves therein adapted substantially to enclose the tube, a pivot mounting for each jaw, the drawing groove in the jaw being eccentric with respect to the pivot, means for rocking the jaws simultaneously around their pivots to reduce the orifice produced jointly by the jaws, said means comprising a common jaw operating element, a connection between the element and each jaw, a longitudinally stationary screw threaded through the element, and means for rotating the screw to propel the element thereon, and means for simultaneously drawing the tube and mandrel through the die, said means comprising a longitudinally stationary screw, means for rotating the screw and a threaded travelling element on the screw connected to the chuck.

5. In a machine for drawing internally and externally tapering tubes, a tapering mandrel of the desired taper of the interior of the tube to be drawn, adapted to be inserted within a tube blank, a chuck adapted to grip the outside of the tube blank and the mandrel therewithin at the large end of the mandrel, a die comprising a plurality of die jaws having drawing grooves therein adapted substantially to enclose the tube, a pivot mounting for each jaw, the drawing groove in the jaw being eccentric with respect to the pivot, means for rocking the jaws simultaneously around their pivots to reduce the orifice produced jointly by the jaws, said means comprising a common jaw operating element, a connection between the element and each jaw, a longitudinally stationary screw threaded through the element, and means for rotating the screw to propel the element thereon, and means for simultaneously drawing the tube and mandrel through the die, said means comprising a longitudinally stationary screw, means for rotating the screw, and a threaded travelling element on the screw connected to the chuck, and means for causing the said screws to rotate concurrently.

6. In a machine for drawing tapered tubes, the combination of a die head, a plurality of lever form die elements pivoted in the head at intermediate portions and having tapered grooved contiguous peripheries on one side of the pivot and lever arms on the opposite side of the pivots, said grooves forming a die orifice, a tube gripping and supporting carriage adapted to maintain the tube in alignment with the die orifice, a source of power, common means connecting all of said lever arms, means driven by the source of power and connected to said common means to move it bodily for simultaneously oscillating the die elements on their pivots to reduce the diameter of the die orifice, and for feeding a tube and mandrel gripped by the carriage into the die orifice at a speed of increased ratio relative to the speed at which the diameter of the die orifice varies.

7. In a machine for drawing internally and externally tapering tubes, a tapering mandrel of the desired taper of the interior of the tube to be drawn, adapted to be inserted within a tube blank, a chuck adapted to grip the tube blank and the mandrel therewithin, at the large end of the mandrel, a die comprising a plurality of die jaws having drawing grooves therein adapted substantially to enclose the tube, a pivot mounting for each jaw, the drawing groove in the jaw being eccentric with respect to the pivot, means for rocking the jaws simultaneously around their pivots to reduce the orifice produced jointly by the jaws, said means comprising an arm on each jaw, a common jaw operating element, a connection element between the common jaw operating element and each arm, and means for propelling the common element bodily longitudinally of the mandrel, and means for propelling the chuck to simultaneously draw the tube and mandrel through the die.

8. In a machine for drawing internally and externally tapering tubes, a tapering mandrel of the desired taper of the interior of the tube to be drawn, adapted to be inserted within a tube blank, a chuck adapted to grip the tube blank and the mandrel therewithin, at the large end of the mandrel, a die comprising a plurality of die jaws having drawing grooves therein adapted substantially to enclose the tube, a pivot mounting for each jaw, the drawing groove in the jaw being eccentric with respect to the pivot, means for rocking the jaws simultaneously around their pivots to reduce the orifice produced jointly by the jaws, said means comprising an arm on each jaw, a common jaw operating element, a link element between the common element and each arm, and means for propelling the common element bodily longitudinally of the mandrel, and means for propelling the chuck to simultaneously draw the tube and mandrel through the die.

9. In a machine for drawing internally and externally tapering tubes, a tapering mandrel of the desired taper of the interior of the tube to be drawn, adapted to be inserted within a tube blank, a chuck adapted to grip the tube blank and the mandrel therewithin, at the large end of the mandrel, a die comprising a plurality of die jaws having drawing grooves therein adapted substantially to enclose the tube, a pivot mounting for each jaw, the drawing groove in the jaw being eccentric with respect to the pivot, means for rocking the jaws simultaneously around their pivots to reduce the orifice produced jointly by the jaws, said means comprising an arm on each jaw, a common jaw operating element, a link element between the common element and each arm, and means for propelling the common element bodily longitudinally of the mandrel, and means for propelling the chuck to simultaneously draw the tube and mandrel through the die, said means comprising a longitudinally stationary, rotatable screw engaging the common element, and a longitudinally stationary, rotatable screw engaging the chuck.

10. In a machine for drawing internally and externally tapering tubes, a tapering mandrel of the desired taper of the interior of the tube to be drawn, adapted to be inserted within a tube blank, a chuck adapted to grip the tube blank and the mandrel therewithin, at the large end of the mandrel, a die comprising a plurality of die jaws having drawing grooves therein adapted substantially to enclose the tube, a pivot mounting for each jaw, the drawing groove in the jaw being eccentric with respect to the pivot, means for rocking the jaws simultaneously around their pivots to reduce the orifice produced jointly by the jaws, said means comprising an arm on each jaw, a common jaw operating element annularly surrounding the axis of the mandrel, a link element connecting the common element with each jaw arm, and means for propelling the common element bodily longitudinally of the mandrel comprising a plurality of longitudinally stationary rotary screws disposed around the mandrel axis and engaged with the common element, and means for propelling the chuck to simultaneously draw the tube and mandrel through the die.

11. In a machine for drawing internally and externally tapering tubes, a tapering mandrel of the desired taper of the interior of the tube to be drawn, adapted to be inserted within a tube blank, a chuck adapted to grip the tube blank and the mandrel therewithin at the large end of the mandrel, a die comprising a plurality of die jaws having drawing grooves therein adapted substantially to enclose the tube, a pivot mounting for each jaw, the drawing groove in the jaw being eccentric with respect to the pivot, means for rocking the jaws simultaneously around their pivots to reduce the orifice produced jointly by the jaws, said means comprising an arm on each jaw, a common jaw operating element annularly surrounding the axis of the mandrel, a connecting element between the common element and each jaw, and means for propelling the common element bodily longitudinally of the mandrel, and means for propelling the chuck to simultaneously draw the tube and mandrel through the die.

In testimony whereof I hereunto affix my signature this 10th day of March, 1928.

BIRNEY C. BATCHELLER.